UNITED STATES PATENT OFFICE.

GEORGE B. McGRATH, OF NORFOLK, VIRGINIA.

METHOD OF MAKING PAVING MIXTURES.

1,234,360.
Specification of Letters Patent.
Patented July 24, 1917.

No Drawing.
Application filed March 4, 1916. Serial No. 82,217.

*To all whom it may concern:*

Be it known that I, GEORGE B. McGRATH, a citizen of the United States, residing at Norfolk, in the county of Norfolk and State of Virginia, have invented new and useful Improvements in Methods of Making Paving Mixtures, of which the following is a specification.

This invention relates to bituminous pavements and the method of making the same, and has as its objects to provide a pavement which has great wear-resisting quality; which is practically impervious to water, moisture or street acids: which is dense, malleable and durable, and which has great stability and possesses to a high degree the characteristic or attribute of resisting deterioration under the strains of traffic to which it is subjected. More specifically, the object of my invention is to definitely determine the quantities of materials to be used and to so proportion and mix the ingredients or materials that the voids in the resultant paving mixture are filled to the desired degree and the particles of the wear-resisting body are held securely in position.

Bituminous pavements usually consist of a wear-resisting body composed of a mineral aggregate, such as crushed stone, sand, or the like, a filler or pulverized material adapted to fill the spaces or voids between the particles of the mineral aggregate, and which consists of powdered stone, limestone, ashes, soil, or the like, and a bituminous binding agent, such as asphalt or the like, which serves to hold the particles of the mineral aggregate and the filler material against dislodgment.

According to the present method of mixing the materials mentioned above to form a bituminous pavement, the proportions and amounts of bituminous and pulverized materials used to form the filler and binder are not definitely determined, but are usually mixed by guess, the judgment of the operator governing the amounts used, and thus a personal factor is injected which, of necessity, varies with each operation. Under this procedure it is quite probable that too small or too great an amount of bituminous binding material may be added to the mineral aggregate, or too small or too great an amount of pulverized material may be added. Heretofore no exact method has been followed in proportioning the materials to insure that proper amounts of either pulverized or bituminous materials are used or that the combined binder and pulverized material in proper amounts be added to the mineral aggregate. The combined bituminous binding agent and pulverized material are herein referred to as the filler product. It has been found, since the results depend upon the judgment of the particular operator, that not infrequently too much binding agent has been used with the result that the mineral aggregate will shift and lose its stability so that it creeps or crawls under traffic strain to which it is subjected with the result that the surface pavement becomes rough and uneven. Furthermore, should an excess of bituminous binding agent, such as asphalt, be used, the unabsorbed bituminous cement is susceptible to climatic conditions and temperature changes softening or hardening the final mixture as the temperature becomes hot or cold, with the result that the unabsorbed bituminous cement soon deteriorates. Should the amount of binding agent be insufficient to properly coat the particles of the aggregate and pulverized material and properly fill the voids therebetween, the smaller particles tend to shift, with the result that the larger particles are subsequently dislodged so that the pavement breaks down and holes and the like develop.

It is an object of this invention to overcome these difficulties by properly proportioning the amounts of the materials used, so that the voids between the particles of mineral aggregate are properly filled and the particles are properly coated, unabsorbed bituminous cement being eliminated. It is desirable to definitely determine the amount of bituminous and pulverized materials necessary to fill the voids in the mineral aggregate, and the amount of pulverized material necessary to be combined with the bituminous agent to insure sufficient amount of the bituminous agent without the introduction of an excess thereof.

The first step of my invention consists in grading the mineral aggregate in accordance with the usual custom. Under the present practice of making sheet bituminous pavements of this general type the mineral aggregate, such as sand, is graded to various sizes and so mixed that the voids or spaces between the coarser grains of sand would be filled with the next smaller size of sand grains, and in turn the voids or spaces between the second size of sand grains would be filled with still smaller particles of sand and so on down through various gradations. In this manner the body of the mineral aggregate is stabilized to a more or less degree, and the voids between the larger grains are greatly decreased.

The next step in my method consists in determining the void volume in mineral aggregate, and while this may be done by several methods I preferably make the determination in the terms of a suitable liquid, such as water. I take a definite amount or volume of the mineral aggregate and place the same in a suitable container or vessel and then add sufficient water to the mineral aggregate to just fill the voids thereof; that is, I bring the level of the water even with the top surface of the mineral aggregate within the container. The exact amount of water necessary to so fill the voids is then determined, and knowing the volume of the aggregate experimented with and the volume of the water necessary to fill the voids thereof, the amount of liquid or water necessary to fill the voids of a unit measure or volume of mineral aggregate can easily be determined.

I then combine the hot bituminous binding agent with the finely pulverized filler material substantially to the limit of absorbing power of the mass of finely pulverized material, producing thereby a filler product which is solid, dense, waterproof and rubber-like in character. The limit of absorbing power of the pulverized material being determined, a product as above described is secured, without any excess or deficiency of bituminous material and it possesses the above characteristics. I have found that the absorbing power of finely pulverized material varies greatly even when the material seems to have the same degree of fineness when tested mechanically by being passed through a screen of a fine mesh. Moreover, I have discovered that pulverized materials of all kinds vary greatly in the percentage of "flour" or so-called impalpable powder which these various pulverized materials contain. I have found, for instance, that two pulverized materials of the same general or geological character may be pulverized so that the same percentage of material in each case passes through a sieve of the same mesh, and yet one lot of the pulverized material will contain very much more of the "flour" than the other lot. This "flour-like" material possesses the greatest absorbing power of the pulverized material which enters into a paving or pavement mixture, and the more variation there is in the volume and weight of this "flour-like" material the more important it is that this fact should be known in making bituminous pavements and that exactly that amount of bituminous cement which the pulverized material will absorb shall be used in conjunction or combination therewith, and that no more be used in order to avoid an excess of bituminous cement or the presence of unabsorbed bituminous cement in the paving mixture, because the same is detrimental thereto, and all this can be accomplished by using an amount of bituminous cement with the pulverized material or materials which is equal to the limit of the absorbing power of the mass of the pulverized material. When this is done the result is a product which is solid, dense and rubber-like in character and which when thoroughly mixed with the mineral aggregate in an amount to fill the voids between the particles thereof up to the factor of safety, results in making a pavement which has the characteristics above described.

To produce the filler product just described, I weigh a specific amount of pulverized material and a specific amount of the hot liquid bituminous material before combining the two. I then pour or combine with the measured amount of pulverized material, portions of the measured amount of hot bituminous material and from time to time take small sample portions of the mixture, which samples are allowed to cool, and if, when cool, these sample portions are solid, dense and rubberlike in character then the limit of the absorbing power of the predetermined mass of pulverized material is reached. The process of combining the pulverized material and the bituminous material may be carried out at any suitable temperature, but the test for determining the limit of the absorbing power of the mass of pulverized material is carried out when the filler product is cold. The remaining amount of hot bituminous material which has not been mixed with the pulverized material is then carefully weighed and subtracted from the previously determined weight of bituminous material, and in this manner the amount of binding agent or bituminous cement mixed with the pulverized material to the limit of the absorbing power of the mass of the latter is definitely determined. The amounts of bituminous and pulverized materials which have been mixed being known, the proportions in which they are mixed, are easily determined.

Having now determined the void volume in the mineral aggregate, and having compounded the bituminous and pulverized material in accordance with the method just described, I then determine the density of the filler product resulting from the combination of bituminous and pulverized materials in accordance with any of the usual methods of determining densities and reduce its density to the terms of water, and if the void volume of the mineral aggregate has been determined by a liquid other than water, I preferably reduce the density of this liquid to the terms of water, so that the specific gravity of both the compounded bituminous and pulverized materials or filler product and the liquid are placed on the same parity.

With the volume of the voids in the aggregate definitely predetermined, preferably in the terms of water, and the filler product having its density reduced to the terms of water, it becomes easy to at once determine what weight of filler product is to be used to fill the desired percentage of the void volume in the mineral aggregate by merely determining the volume of the bulk of mineral aggregate and the void volume of the same and then multiplying the latter by the specific gravity of the filler product.

Before mixing the filler product with the mineral aggregate I add to such aggregate a sufficient amount of bituminous material to thoroughly coat the surface of the particles in the mineral aggregate and bind them together without providing any excess or deficiency of such bituminous material. The filler product, together with the added bituminous material, is then heated and thoroughly mixed with hot mineral aggregate, and as the amount of filler material necessary to fill the voids to the degree desired has been determined and only such amount of bituminous material is added to properly coat the particles of the mineral aggregate, it is possible to avoid using too much or too little an amount of bituminous cement or filler product, and thus the voids are properly filled, and the grains cannot be separated or pushed apart. The use of too little filler product is also avoided and, therefore, the particles cannot shift or become dislodged.

It will be noted that in accordance with my method the bituminous material is considered as two factors and not as one factor as it has heretofore been considered. The one factor in question is that amount of bituminous material which is used in coating the grains or particles of sand or mineral aggregate and cementing them together, and the other factor is that amount of bituminous material which is incorporated with the pulverized material. By my method the correct amount of bituminous material in each instance can be definitely ascertained to properly perform its function in its part of the paving structure. The necessity of making a separate determination in two factors of the amount of bituminous material to be used is explained by the fact that the amounts used to coat the particles of the aggregate is a variable quantity, dependent on the variations in the sizes of the grains thereof and the amount absorbed by the pulverized material is also a variable quantity, dependent partly on the degree of pulverization of the material and partly on the amount of "flour" or impalpable powder therein. Thus the exact amount of bituminous cement to be used is determined in accordance with my invention, and an excess or deficiency of the same is avoided. It is specifically pointed out that no matter what amount of filler product is used in filling or partially filling the predetermined void volume in the mineral aggregate, there will be no excess of bituminous material because the pulverized material in the filler product contains only that amount of bituminous material which it will absorb in the mass and hold confined therein.

Only such amount of bituminous cement is necessary to be added to the mineral aggregate to act as a thin covering for the outside surface of each particle of sand and to insure that each particle of sand may be cemented together. It is necessary to coat the particles of the mineral aggregate because hot dry sand mixed with the combined pulverized material or materials and bituminous cement to form the filler product above described might have a tendency to absorb or withdraw a part or portion of the bituminous cement from the pulverized material, thus leaving the latter in a drier state than it should be, and, therefore, not providing a sufficient and proper amount of bituminous cement in the entire paving or pavement mixture.

The pulverized material may be varied to suit conditions, and I do not wish to limit myself to any particular kind of pulverized material, but I might mention among those which may be used, powdered limestone, Portland cement, slate, or the like. It is, of course, obvious that my invention is susceptible of various changes and modifications and that I do not wish to limit myself to the specific materials referred to herein unless otherwise so specified in the claims, and that various other methods may be used for determining the exact proportions or amounts of ingredients to be admixed.

I claim:—

1. The method of making pavements or paving mixtures which consists in first determining the volume of the voids in the mineral aggregate, definitely determining the amount of bituminous cement to be mixed with the pulverized material to form a filler product in which the particles of the pulverized material are thoroughly coated and bound together without an excess or deficiency of bituminous cement, and then adding to the mineral aggregate sufficient amount of the filler product so formed to fill the desired percentage of the volume of voids thus determined.

2. The method of making pavements or paving mixtures which consists in first determining the volume of voids in the mineral aggregate, mixing with finely pulverized material a bituminous agent in sufficient amounts to substantially the limit of the absorbing power of the mass of the pulverized material, then adding to the mineral aggregate the filler product so formed in sufficient quantity to fill the desired percentage of the volume of voids thus determined.

3. The method of making pavements or paving mixtures which consists in first determining the volume of the voids in the mineral aggregate, forming a filler product by adding bituminous material to pulverized material to substantially the limit of the absorbing power of the mass of pulverized material, then adding to the filler product an amount of the bituminous material necessary to coat the particles of the mineral aggregate, and finally adding to the mineral aggregate the hot filler product together with the added bituminous agent in sufficient quantity to fill the desired percentage of the volume of the voids thus determined.

4. The method of making pavements or paving mixtures which consists in first determining the volume of the voids in the mineral aggregate, forming a filler product by adding the bituminous material to the pulverized material in sufficient amount to coat the particles of the latter without an excess or deficiency of bituminous material, and adding to the mineral aggregate the hot filler product and sufficient bituminous cement to coat the particles of the mineral aggregate and fill the desired percentage of the volume of voids thus determined.

5. The method of making pavements or paving mixtures which consists in grading the aggregate to sizes, determining the volume of a portion of said aggregate, adding a liquid to said portion in sufficient quantities to fill the voids thereof, and determining the amount of liquid so added, combining hot bituminous material with pulverized material to substantially the limit of the absorbing power of the latter, determining the specific gravity of the filler product and the amount necessary to fill the voids, and then mixing the filler product to the mineral aggregate in sufficient amount to fill the desired percentage of the volume of voids thereof.

6. The method of making pavements and paving mixtures which consists in grading the aggregate to sizes, determining the volume of a portion of said aggregate, adding a liquid to said portion in sufficient quantities to fill the voids thereof, and determining the amount of liquid so added, combining hot bituminous material with finely pulverized material to substantially the limit of the absorbing power of the latter, determining the specific gravity of the filler product and the amount necessary to fill the voids, mixing with the filler product a sufficient quantity of bituminous material to coat the particles of mineral aggregate, and then mixing the filler product together with the added bituminous material to the mineral aggregate in sufficient amount to fill the desired percentage of the volume of the voids thereof.

In testimony whereof I have hereunto set my hand in presence of two subscribing witnesses.

GEORGE B. McGRATH.

Witnesses:
GERTRUDE M. STUCKER,
C. H. FESLER.